C. L. Pierce,
Sawing Shingles.
N° 54,010.　　　　　Patented Apr. 17, 1866.
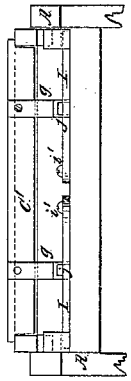
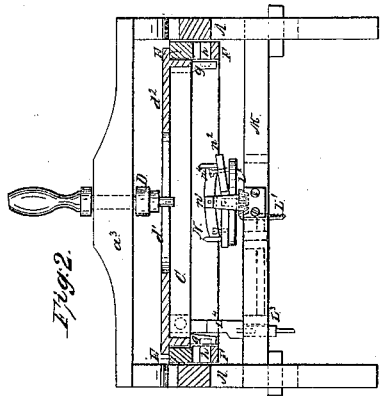
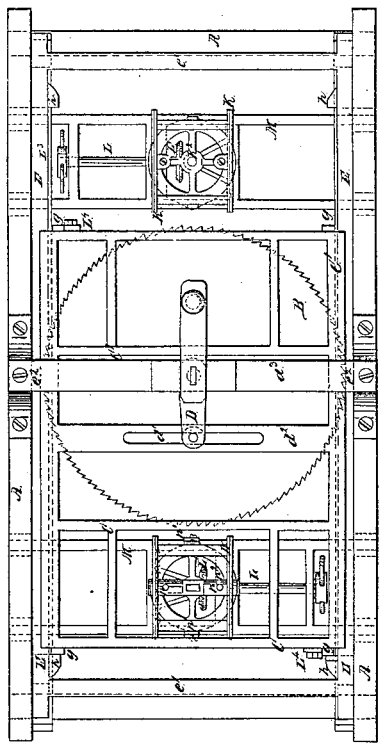
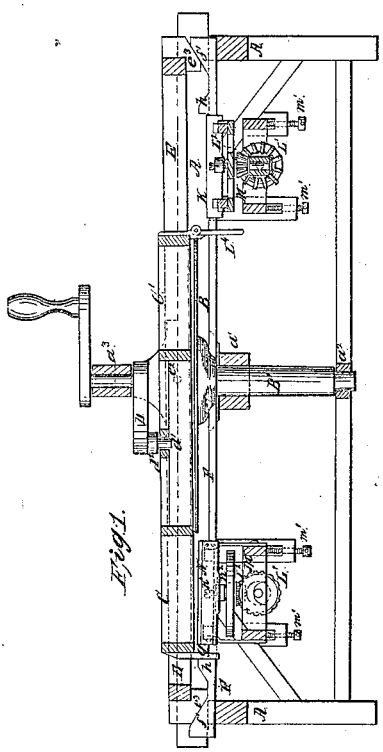
Witnesses:　　　　　　　　　　Inventor:

ns, one
UNITED STATES PATENT OFFICE.

CHARLES L. PIERCE, OF BUFFALO, NEW YORK.

IMPROVEMENT IN SHINGLE-MACHINES.

Specification forming part of Letters Patent No. 54,010, dated April 17, 1866.

*To all whom it may concern:*

Be it known that I, CHARLES L. PIERCE, of the city of Buffalo, county of Erie, and State of New York, have invented certain new and useful Improvements in Shingle-Sawing Machines; and I do hereby declare that the following is a full, clear, and exact description thereof, reference being had to the accompanying drawings, making a part of this specification, in which—

Figure I is a longitudinal section of my improved machine. Fig. II is a transverse sectional elevation. Fig. III is a plan view of the same; and Fig. IV is an end view, showing a device for operating the rocking frame herein described.

This invention relates to that class of shingle-sawing machines in which shingle-blocks are presented to the saw alternately on opposite sides thereof in a manner to keep the saw constantly at work.

Its nature consists, first, in supporting the reciprocating block-carriage, which carries the blocks to and from the saw, upon a tilting track, alternately inclined to the plane of the saw in opposite directions, in a manner to give the required rake to the saw when the block is moving toward it and raise the block from the saw when it is receding therefrom; second, in a device for tilting the blocks at each stroke of the block-carriage, consisting of a rotary table inclined to the plane of the saw, but with its axis parallel to the axis of the saw, so that each semi-revolution of the table will reverse its inclination and that of the block, so that the butts of the shingles will be cut alternately from opposite ends of the block; third, in a modification of the preceding device by which the inclination of the block-table is changed by tilting the same upon an axis by the periodic movement of cam-arms beneath it.

Letters of like name and kind refer to like parts in each of the figures.

A A represent the main frame-work, upon which all other parts of the machine are supported.

B is the circular cutting-saw, supported by a vertical spindle, B′, having bearings in transverse bridge-trees $a'$ $a^2$, and is given motion in any convenient or common manner.

C C′ represent a reciprocating double block-carriage, consisting of two open rectangular frames, each carrying a shingle-block, one frame presenting its block to one side of the saw and the other frame to the opposite side of the saw, alternating with the reciprocating motion of the carriages. The reciprocating motion is imparted to this double block-carriage by means of the overhung crank D, working in a slot, $d'$, made in the cross-bar $d^2$, attached to the double block-carriage equidistant from each frame. The overhung crank D is supported by a transverse bridge-tree, $a^3$, the axis of the crank coinciding with that of the saw and its spindle.

The block-carriage reciprocates upon and is supported by a tilting track, consisting of the parallel rails E, connected at their ends by cross-bars $e'$, the fulcrum $e^2$ of this tilting track-frame being in the plane of the axis of the saw-spindle and overhung crank.

At each end of the track-rails an inclined plane or wedge is formed upon the under side thereof, which is represented at $e^3$.

F represents two bars resting upon the end frame-timbers and moving in guides, one under each rail of the tilting track, there being formed upon each end of each bar an inclined plane or wedge, as shown at $f'$, which corresponds with and bears against the inclined plane $e^3$ of the tilting track-rails, so that a short movement of the wedge-bars in one direction will raise one end of the track-rails and lower the other (tilting them on their fulcrums $e^2$) and incline them slightly to the plane of the saw, and their movement in the opposite direction will reverse the inclination of the rails to the saw. These movements of the wedge-bars F are imparted to them from the block-carriage, near the ends of the strokes or movements thereof, by means of dogs $g$, attached to the carriage, which dogs strike against stop-pieces $h$, connected to the bars F at the proper points.

The angle of the wedges and their movement with reference to the movements of the block-carriage is such as to so incline the carriage-tracks and carriage that the receding block will be raised up clear from the saw and the approaching block held down to the saw, the inclination of the tracks and carriage being reversed at or near the same time that the carriage changes the direction of its movement. By this arrangement the saw is given the rake with reference to the approaching block which is required to cause it to cut freely through the same, and is prevented from marring or marking the receding block by contact therewith. It also prevents the dulling of the saw which would result from contact of the receding block therewith.

In Fig. IV a modification of the device for giving the wedge-bars F their requisite movement is represented. It consists of two levers, I, having their fulcrums at $i'$, near the center of and resting upon the end cross-pieces of the main frame, and upon which rest also the wedge-bars F, the ends of levers I extending into slots made in the wedge-bars F. Stop-pieces $j$ are attached to the arms at a point between their fulcrums $i'$ and the bars F. The dogs $g$ are attached to the block-carriage in the line with the stops $j$, so that when the block-carriage has nearly reached the extent of its movement the dogs $g$ will engage the stops $j$ and move the levers upon their fulcrums, giving the bars F the required movement.

The principal advantage which this mode of operating the wedge-bars possesses over the one hereinbefore described is that a shorter portion of the movement of the block-carriage gives the required movement of the bars F.

The block-carriage is provided with suitable dogging devices, of any approved construction, for holding the blocks in their passage to and from the saw.

I have represented two distinct devices in the drawings for inclining the block to the plane of the saw to give the shingles the required taper. The first is shown at the right-hand side of Figs. I and III, and consists of a block-table, K, supported by a spindle, K′, parallel to the saw-spindle, the plane of the table being inclined to that of the saw to a degree corresponding to the required taper of the shingle, and set below the same a distance equal to the required thickness of the shingle, the shingle-block being dropped upon this table as it is brought back by the carriage, the dogging device letting go its hold upon the block for this purpose at the proper time, and taking hold again as the movement of the carriage again carries the block toward the saw. A semi-revolution of the block-table will reverse its inclination to the saw, and this being effected at each time the block is brought to it by the movement of the carriage, the inclination of the block will be reversed each time it is carried to the saw, so that the butts of the shingles will be cut alternately from opposite ends of the block.

The semi-revolution of the table is effected as follows: A horizontal shaft, L, at right angles to the movement of the carriage, carries a bevel-wheel, L′, which gears with a pinion, $L^2$, of one-half its diameter, upon the table-spindle K′, and also carries a four-armed ratchet or spider, $L^3$, with which, as the carriage approaches the end of its return movement, a dog, $L^4$, connected therewith, engages, giving a quarter-revolution to the horizontal shaft L and consequent semi-revolution to the block-table.

The block-table and shaft L are supported by a transverse frame, M, made vertically adjustable by set-screws $m'$, to regulate the thickness of the shingles by adjusting the difference between the level of the block-table and saw. The block-table is further provided with adjusting-screws, by which its inclination to the saw may be varied as the desired taper of the shingles may require.

The second block-tilting device is shown at the left-hand side of Figs. I and III and also in Fig. II, and consists of a block-table, N, occupying the same relative position to the carriage and saw as the table K, but to change its inclination by tilting on a fixed axis, $n'$, which tilting is effected by the revolution beneath it of two or more cam-arms, $n^2$, on a vertical spindle, $n^3$, given a semi-revolution in the same time and by the same means as in the previously-described device. These cam-arms are provided with adjusting-screws $n^4$, by which their throw and the consequent inclination of the table may be adjusted, when required, for the purpose before stated.

The whole device is supported by an adjustable frame, M, the same as described for the preceding device.

Having thus described my invention, what I claim, and desire to secure by Letters Patent, is—

1. The tilting track E, in combination with the reciprocating block-carriage, when arranged and operating in the manner and for the purpose substantially as described.

2. The inclined rotary block-table K, for tilting the shingle-blocks, substantially as described.

3. The combination, with the tilting-table N, of the rotary adjustable cam-arms $n^2$, for tilting the shingle-blocks, substantially as described.

CHAS. L. PIERCE.

Witnesses:
B. H. MUEHLE,
F. A. LANGWORTHY.